United States Patent [19]

Sonagere

[11] Patent Number: 5,179,798
[45] Date of Patent: Jan. 19, 1993

[54] PORTABLE GREENHOUSE

[76] Inventor: Henry Sonagere, 5040 SE. Burningtree Cir., Stuart, Fla. 34977

[21] Appl. No.: 625,748
[22] Filed: Dec. 11, 1990
[51] Int. Cl.⁵ .............................................. A01G 13/04
[52] U.S. Cl. ........................................................ 47/29
[58] Field of Search ...................... 47/29; 24/30.5, 543

[56] References Cited

U.S. PATENT DOCUMENTS

| | | | |
|---|---|---|---|
| 939,316 | 11/1909 | Ranum | 24/30.5 R |
| 2,104,305 | 1/1938 | Marble | 24/543 |
| 2,568,511 | 9/1951 | Ogden | 24/543 |
| 3,051,185 | 8/1962 | Reynolds . | |
| 3,088,244 | 5/1963 | Commisso . | |
| 4,442,626 | 4/1984 | Hammond | 47/29 |
| 4,827,957 | 5/1989 | Chang . | |

FOREIGN PATENT DOCUMENTS

| | | | |
|---|---|---|---|
| 2413835 | 2/1975 | Fed. Rep. of Germany | 47/29 |
| 3031799 | 6/1982 | Fed. Rep. of Germany | 47/29 |
| 562890 | 6/1960 | France . | |
| 1314473 | 12/1962 | France | 47/29 |
| 2596946 | 10/1987 | France | 47/29 |
| 410510 | 10/1966 | Switzerland | 47/29 |
| 1551771 | 8/1979 | United Kingdom . | |
| 2104365 | 3/1983 | United Kingdom . | |

Primary Examiner—Henry E. Raduazo
Attorney, Agent, or Firm—Dykema Gossett

[57] ABSTRACT

A portable greenhouse is disclosed which comprises a support member which can be shaped to conform to the particular size of plants which are to be protected. Each support member comprises first and second rods which extend generally parallel to each other, but which are spaced to define a space for receiving a plastic sheet to enclose the greenhouse. The support members are individually tailored to cover particular plants, and are inserted into the ground. The sheet is then placed into the space between the rods and encloses the plants. The inventive greenhouse assembly may be easily packaged and modified to conform to various types of plants.

4 Claims, 2 Drawing Sheets

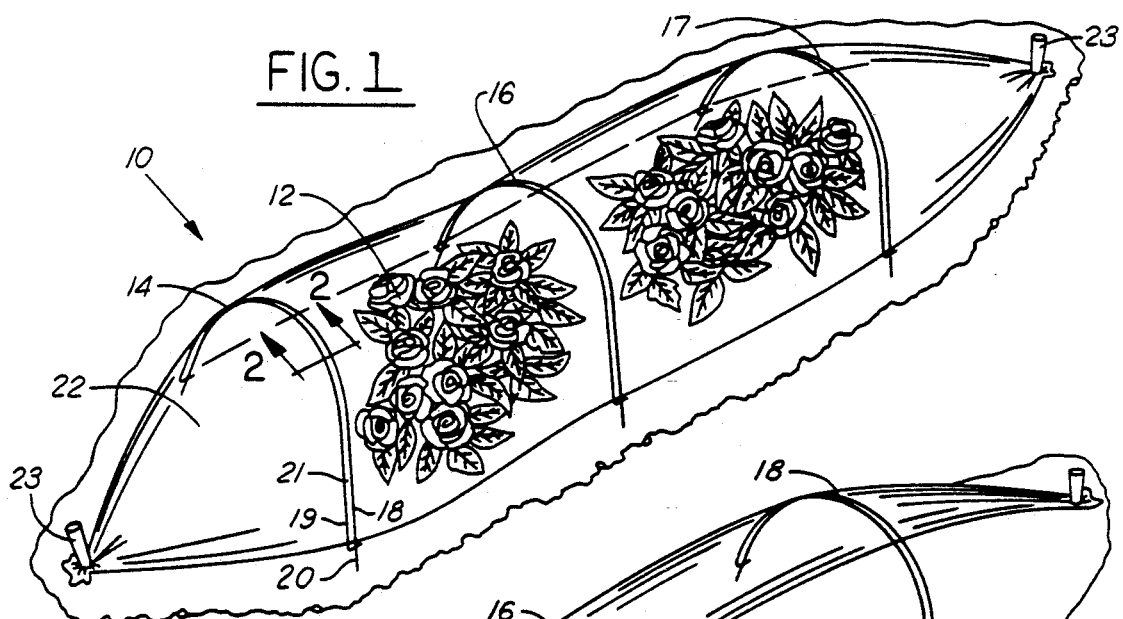
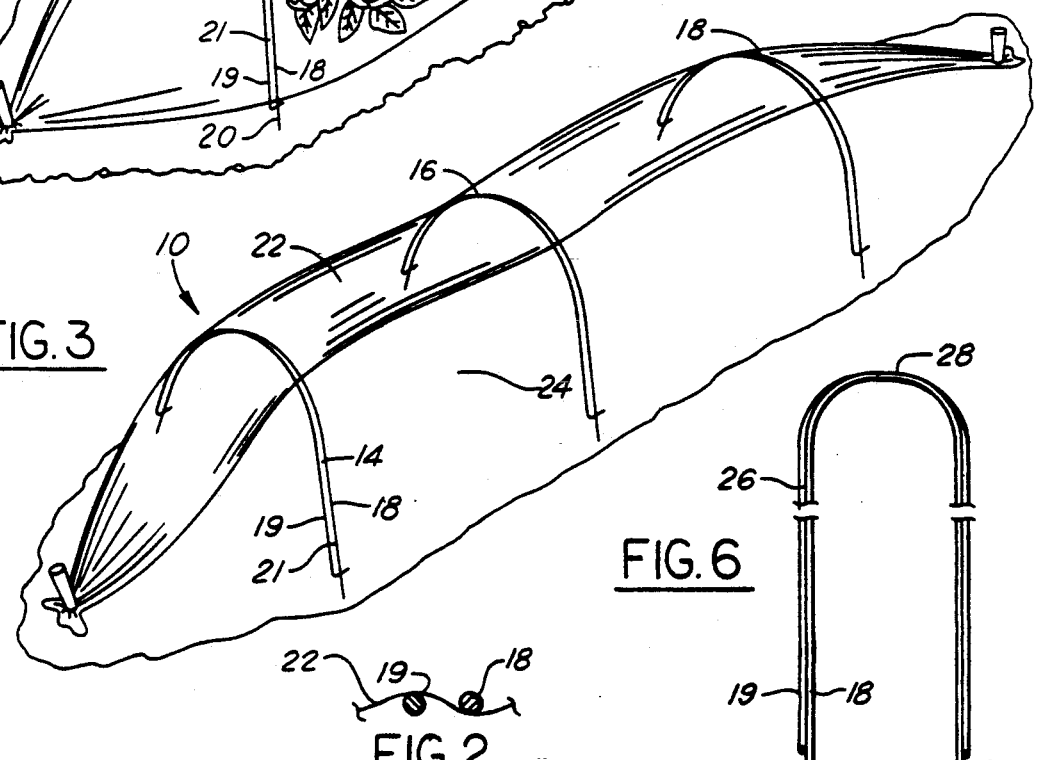
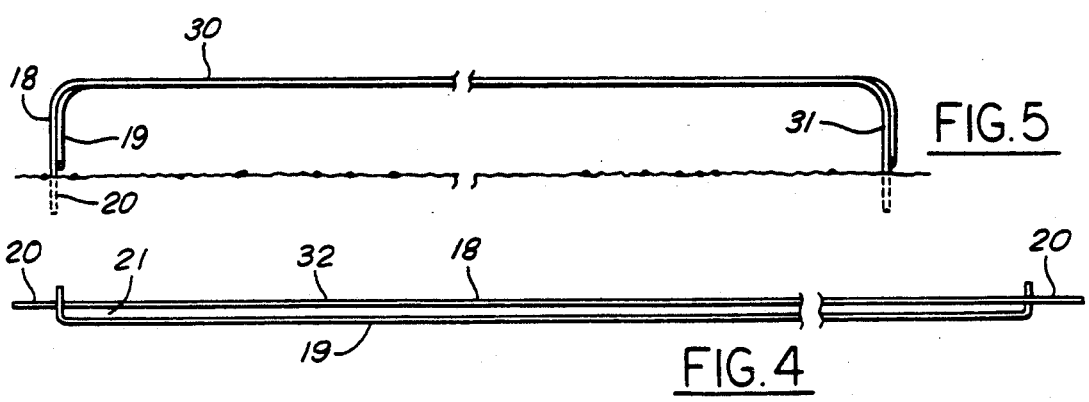

PORTABLE GREENHOUSE

BACKGROUND OF THE INVENTION

This application in general relates to a portable greenhouse. More particularly, this invention relates to a greenhouse which can be tailored to conform to the shape of particular plants that are to be protected.

Several prior art greenhouses are known for protecting plants. A first known type is illustrated in U.S. Pat. No. 4,827,957, which discloses a shelter to protect plants or crops from adverse conditions. This disclosed shelter is complex and may not be practical for protecting small garden plants.

Less complex greenhouses are also known. U.S. Pat. No. 3,051,185 discloses an arched shelter support including a sheet disposed over a support structure. Although this disclosed greenhouse is simpler than the above-discussed greenhouse, it would still be desirable to have a less complex structure which can be tailored to various size plants.

A device similar to that disclosed in the '185 patent is disclosed in the U.S. Pat. No. 442,626. Although this device has several beneficial features, it would still be desirable to have a greenhouse which can be tailored to the shape of individual plants which are to be protected.

The British patent specifications 1,551,771 and 2,104,365 both disclose relatively simple greenhouse structures. While these greenhouse have advantages over some prior art structures, they may not be tailored to particular plants.

French reference 562,890 discloses a greenhouse which includes two support members spaced from each other to define a space for receipt of a sheet. This structure having several benefits over prior art structures, but is still deficient in that it may not be tailored to individual plants.

U.S. Pat. No. 3,088,244 discloses a protective cover for plants which comprises a plurality of frame members. These frame members require a complicated plastic sheet to complete the greenhouse enclosure. For this reason, the structure disclosed in this patent is somewhat undesirable.

It is an object of the present invention to disclose a greenhouse which can be shaped to conform to individual plants, and at the same time is formed of relatively simple components. Further, it is an object of the present invention to disclose such a greenhouse which can use standard plastic sheets.

SUMMARY OF THE INVENTION

A disclosed embodiment of the present invention includes straight support members which comprises two rods extending generally parallel to each other, but spaced to define a space for receiving a plastic sheet. The support members are shaped to conform to particular plants that are to be protected, and a plastic sheet is received in the space between the rods. Pegs are received in the ground at each axial end of the support members to secure the plastic sheet to the ground. In this way, it is ensured that the plants are enclosed by the plastic sheet.

In a preferred embodiment of the present invention, a plurality of such supports are used. Further, the supports are preferably formed of a first rod extending between two spike ends which secure the supports in the ground. A second rod extends generally parallel to the first rod but has ends which extend perpendicular to the first rod, and are secured to the first rod to define the space for receiving the plastic sheet.

The support members are shaped to conform to particular plants. As an example, the support members may be shaped such that they extend vertically for a greater distance than they extend laterally to cover and protect tall plants. In the alternative, the support members may be shaped such that they extend laterally for a greater extent that they extend vertically, to protect wide plants, or a plurality of seedling rows. The support member may be shaped such that it lies against the side of a home to protect plants along the side of the structure.

In a method according to the present invention, a support member is formed by attaching two rods to each other to define a space. An area to be protected is identified and the support members are shaped to conform to the plants in that area. Support members are inserted into the ground, and a plastic sheet is passed in the space between the rods. The ends of the sheet are then pegged to the ground to fully enclose the plant. The sheet may be slid within the space to provide access to the plants without fully removing the entire greenhouse.

These and other objects and features of the present invention can be best understood from the following specification and drawings, of which the following is a brief description.

BRIEF DESCRIPTION OF THE DRAWINGS

FIG. 1 is a perspective view of a portable greenhouse according to the present invention.

FIG. 2 is a partial, cross-sectional view along line 2—2 as shown in FIG. 1.

FIG. 3 is a perspective view of the greenhouse illustrated in FIG. 1 showing a further feature of the invention.

FIG. 4 shows a first support member extending in an unshaped straight orientation.

FIG. 5 is a cross-sectional view through a first modification of the inventive greenhouse.

FIG. 6 shows a second modification of the greenhouse.

DETAILED DESCRIPTION OF A PREFERRED EMBODIMENT

Figure 7:
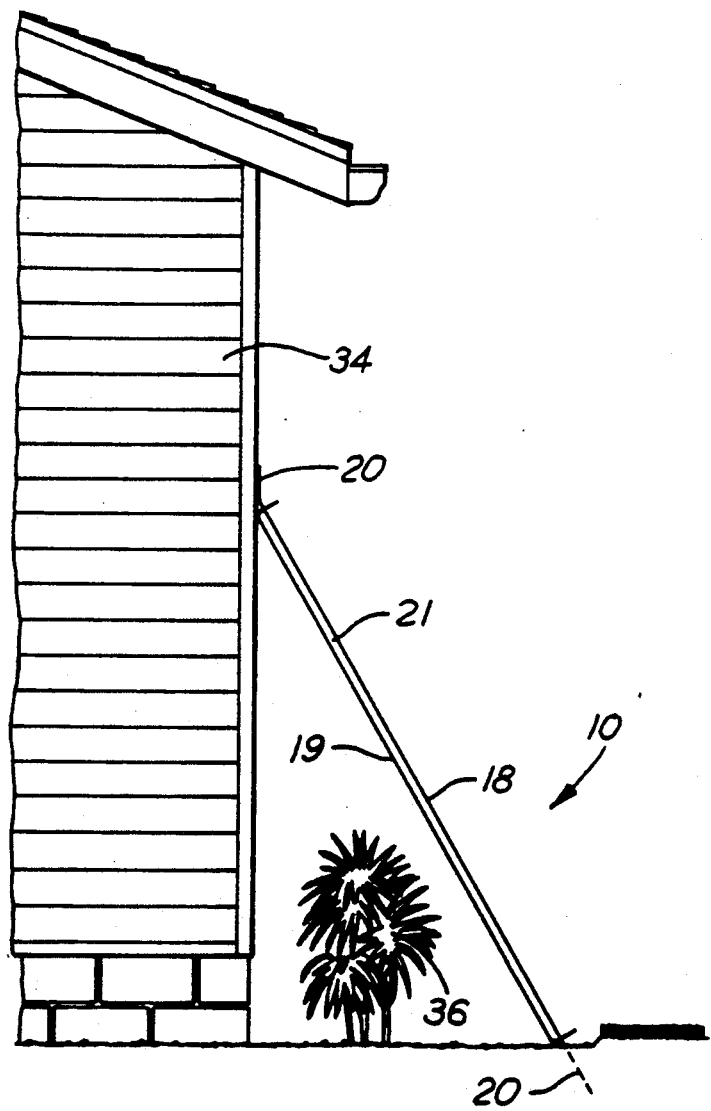
FIG. 7 shows a third modification of the greenhouse.

Portable greenhouse 10 is illustrated in FIG. 1 for protecting plant 12. A plurality of supports 14, 16 and 17 are spaced axially and support the greenhouse structure. Supports 14, 16 and 17 each comprise first rod 18 and second rod 19 which are spaced from each other. First rod 18 extends for a greater distance than second rod 19 and has spike ends 20 to secure the supports in the ground. Second rod 19 has portions at its end which extend perpendicular to first rod 18, and are welded to first rod 18, defining space 21 between first rod 18 and second rod 19. Plastic sheet 22 is received in space 21 on each support 14, 16 and 17. Pegs 23 are received at each axial end of greenhouse 10 to secure the plastic sheet to the ground. In this way, it is ensured that plastic sheet 22 fully encloses plant 12.

FIG. 2 is a cross-sectional view showing first rod 18 spaced from second rod 19 by space 21. Plastic sheet 22 is received in space 21.

FIG. 3 shows a further feature of greenhouse 10 in which plastic sheet 22 can be moved partially upwardly within space 21 such that access is provided to space 24 under sheet 22. In this way, a gardener can gain access to plants 12 without fully removing greenhouse 10.

FIG. 4 shows straight support 32 having first rod 18 extending beyond second rod 19. Spike ends 20 extend beyond second rod 19 to be received in the ground. Space 21 is defined between first and second rods 18 and 19. Straight support 32 may be shaped to conform to the shape of the particular plant to be protected.

An example of a shaped support is illustrated in FIG. 5. Should it be desired to protect plants which extend generally low to the ground over a wide area, the lateral extent 30 of greenhouse 10 is made greater than the vertical extend 31. In this way, a relatively wide areas of plants can be protected with a single greenhouse 10.

Alternatively, as illustrated in FIG. 6, should it be desired to protect a particularly tall plant, the vertical extent 26 is made greater than the lateral extent 30. In this way a relatively tall plant can also be protected.

It should be understood that one simply identifies a particular plant which is to be protected, and shapes straight support 32 such that it conforms to the particular plant. Whether the particular plant is relatively vertically high or relatively laterally wide, the same support member 32 can define a greenhouse 10 which will fully enclose the plant.

One last modification is illustrated in FIG. 7. FIG. 7 illustrates greenhouse 10 lying along building 34. In this embodiment, one spike end 20 is bent relative to first rod 18 such that it lies on building 34. The opposed spike end 20 is inserted into the ground. Pegs 23 are also used with this embodiment, and a sheet is received in space 21 to fully enclose plant 36.

A method according to the present invention will now be disclosed with reference to the figures. When it is desired to provide protection to a particular plant 12, one shapes straight supports 32 such that their lateral and vertical extents conform to that of plant 12. The support is then inserted into the ground, with at least one spike 20 inserted into the ground to secure the support. Plastic sheet 22 is then received in space 21 defined between first rod 18 and second rod 19. In this way, it is ensured that greenhouse 10 will fully enclose plant 12.

With the inventive greenhouse 10, all components which form the final greenhouse are easily packageable for transport. The greenhouse would comprise two pegs 23, plastic sheet 22, and a plurality of straight support members 32. The entire greenhouse can be packaged into a relatively small axially extending box. This is a large advantage over the prior art devices which were more difficult to package.

Although a preferred embodiment has been disclosed, a worker of ordinary skill in the art would recognize that certain modifications will come within the scope of this invention. For this reason, the following claims should be studied in order to determine the true scope and content of the present invention.

I claim:

1. A method of protecting plants comprising the steps of:
   (1) providing a first rod having a first length, providing a second rod having a length shorter than said first rod and two end portions extending at right angles to said shorter length, securing the ends of said second rod to said first rod whereby end portions of said first rod extend beyond the right angle portions to form spikes and said first and second rods extend in spaced parallel relationship, said space being such that when said rods are bent into an arch like shape sufficient space remains between said rods to loosely receive a sheet of plastic in slidable or freely movable relationship relative to said first and second rods;
   (2) identifying an area to be protected;
   (3) shaping the supports to conform to plants to be protected in the area;
   (4) placing a plurality of supports in the ground with the spikes being inserted into the ground;
   (5) providing a plastic sheet of sufficient size to cover said area having axial ends and lateral ends; and
   (6) securing peg members at each axial end of the plurality of supports, and securing the sheet to the pegs to close off the axial ends of the sheet and protect plants covered by the sheet, the sheet remaining freely movable relative to first and second rods such that it may be pulled upwardly between the first and second rod to provide access to the area to be protected, the sheet remaining secured by the peg member when it is pulled upwardly.

2. The method as recited in claim 1, including the further step of adjusting the lateral ends of the plastic sheet to contact the ground adjacent each of said spikes.

3. A method as recited in claim 1, wherein the support extends laterally for a greater extent than it does vertically.

4. A method as recited in claim 1, wherein the support extends vertically for a greater extent than it does laterally.

* * * * *